US012695333B2

(12) United States Patent
Lagnado et al.

(10) Patent No.: US 12,695,333 B2
(45) Date of Patent: Jul. 28, 2026

(54) POWER STATES BASED ON WIRELESS CHARGERS

(71) Applicant: Hewlett-Packard Development Company, L.P., Spring, TX (US)

(72) Inventors: Isaac Lagnado, Spring, TX (US); Jerome Arnaud Antoine Bove, Taipei City (TW); Chih-Ping Tom Chung, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 708 days.

(21) Appl. No.: 18/043,322

(22) PCT Filed: Sep. 4, 2020

(86) PCT No.: PCT/US2020/049389
§ 371 (c)(1),
(2) Date: Feb. 27, 2023

(87) PCT Pub. No.: WO2022/050952
PCT Pub. Date: Mar. 10, 2022

(65) Prior Publication Data
US 2023/0275470 A1    Aug. 31, 2023

(51) Int. Cl.
*H02J 7/00* (2026.01)
*G06F 1/16* (2006.01)
*G06F 1/3206* (2019.01)
*H02J 7/14* (2006.01)
*H02J 50/10* (2016.01)
*H02J 50/80* (2016.01)
*H02J 50/90* (2016.01)

(52) U.S. Cl.
CPC ............ *H02J 50/80* (2016.02); *G06F 1/1632* (2013.01); *G06F 1/3206* (2013.01); *H02J 50/10* (2016.02); *H02J 50/90* (2016.02)

(58) Field of Classification Search
CPC . H02J 50/10; H02J 50/80; H02J 50/90; G06F 1/1632; G06F 1/3206
USPC ......................................................... 320/132
See application file for complete search history.

(56) References Cited

U.S. PATENT DOCUMENTS

| | | | |
|---|---|---|---|
| 7,899,397 B2 | 3/2011 | Kumar | |
| 9,184,619 B2 | 11/2015 | Nylen | |
| 9,658,670 B1 * | 5/2017 | Sultenfuss | H02J 7/02 |
| 10,256,660 B2 | 4/2019 | Sultenfuss et al. | |
| 10,439,436 B2 | 10/2019 | Van Wageningen et al. | |
| 2003/0208437 A1 * | 11/2003 | Samuelson | H02J 3/008 |
| | | | 705/37 |

(Continued)

FOREIGN PATENT DOCUMENTS

| | | |
|---|---|---|
| CN | 104199522 A | 12/2014 |
| EP | 3700098 A1 | 8/2020 |

*Primary Examiner* — Alexis B Pacheco
(74) *Attorney, Agent, or Firm* — Quarles & Brady LLP

(57) ABSTRACT

Examples of electronic devices are described herein. In some examples, an electronic device includes a wireless charger. In some examples, the electronic device includes a controller to cause the electronic device to enter a first power state in response to determining that a remote device is placed on the wireless charger. In some examples, the controller is to cause the electronic device to enter a second power state in response to determining that the remote device is removed from the wireless charger.

13 Claims, 4 Drawing Sheets

Electronic Device *102*

Controller *106*

First Power State *110*

Second Power State *112*

Wireless Charger *108*

Remote Device *104*

(56)          References Cited

U.S. PATENT DOCUMENTS

| | | | |
|---|---|---|---|
| 2007/0093231 A1* | 4/2007 | Abhishek | H04W 52/0216 |
| | | | 455/343.4 |
| 2013/0324035 A1 | 12/2013 | Strommen | |
| 2014/0103867 A1 | 4/2014 | Baarman | |
| 2014/0113689 A1* | 4/2014 | Lee | H01M 10/44 |
| | | | 455/573 |
| 2014/0159646 A1* | 6/2014 | Sankar | H02J 50/05 |
| | | | 307/149 |
| 2016/0049825 A1 | 2/2016 | Green et al. | |
| 2016/0141908 A1* | 5/2016 | Jakl | H02J 50/10 |
| | | | 320/108 |
| 2018/0226844 A1 | 8/2018 | Lee et al. | |
| 2018/0233956 A1* | 8/2018 | Moussaoui | H02J 50/12 |
| 2019/0348853 A1* | 11/2019 | Swan | H02J 50/10 |
| 2020/0143119 A1* | 5/2020 | Mars | H02J 50/80 |
| 2020/0144867 A1* | 5/2020 | Sultenfuss | H02J 50/10 |
| 2020/0335990 A1* | 10/2020 | Matsushima | H02J 7/00034 |
| 2021/0006624 A1* | 1/2021 | Brewer | H04W 4/38 |
| 2021/0075233 A1* | 3/2021 | Okabayashi | H02J 7/04 |
| 2021/0075243 A1* | 3/2021 | Uesugi | H01M 10/425 |
| 2021/0216126 A1* | 7/2021 | Dearman | G06F 1/26 |

* cited by examiner

FIG. 1

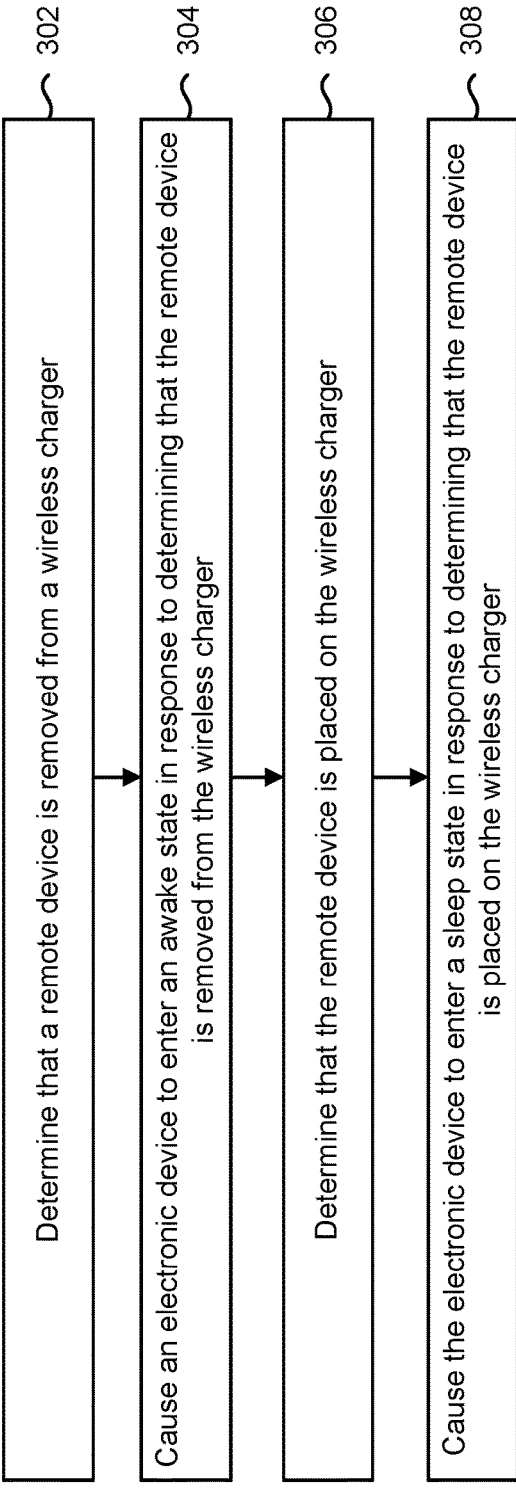

302 — Determine that a remote device is removed from a wireless charger

304 — Cause an electronic device to enter an awake state in response to determining that the remote device is removed from the wireless charger 306 — Determine that the remote device is placed on the wireless charger 308 — Cause the electronic device to enter a sleep state in response to determining that the remote device is placed on the wireless charger

POWER STATES BASED ON WIRELESS CHARGERS

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 1 is a diagram illustrating an example of an electronic device that may be utilized for entering power states based on a wireless charger;

FIG. 3 is a flow diagram illustrating an example of a method for entering power states based on a wireless charger.

Figure 2:
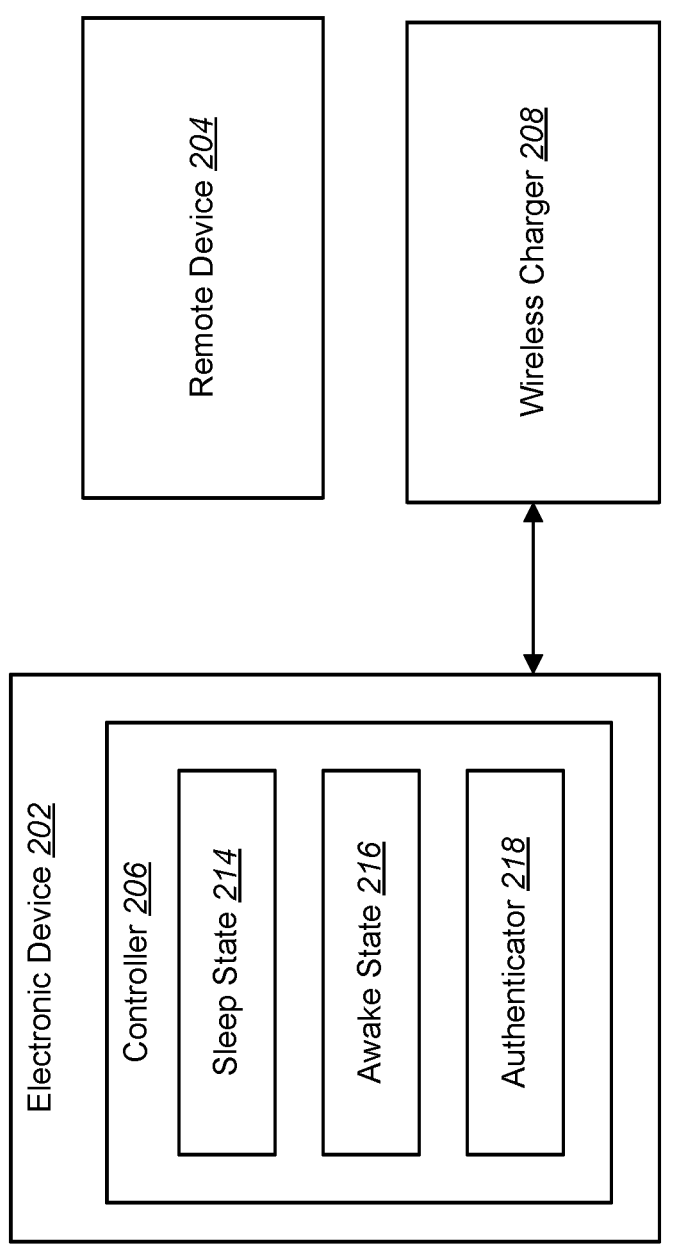
FIG. 2 is a block diagram illustrating another example of an electronic device that may be utilized for entering power states based on a wireless charger.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, all-in-one computers, smartphones, tablet devices, graphic tablets, multi-touch devices, wireless communication devices, game consoles, game controllers, smart appliances, vehicles with electronic components, aircraft, drones, robots, smart appliances, etc.

The electronic device may include or may be coupled to a wireless charger. In some examples, the wireless charger may perform wireless charging of a remote device (e.g., a keyboard, mouse, controller, smartphone, tablet computer, etc.). In some examples, wireless charging (also referred to as inductive charging or cordless charging) may be a type of wireless power transfer from the wireless charger to the remote device. The wireless charger may use electromagnetic induction to transfer electricity to the remote device. Electricity may be transferred from the wireless charger to the remote device through inductive coupling. In some examples, the wireless charger may operate according to wireless charging standards (e.g., Qi standards, near-field communication (NFC) standards, AirFuel standards, etc.).

In some examples, the wireless charger may be integrated into the electronic device or may be a separate component that is in communication with the electronic device. In an example, the electronic device may be an all-in-one computer that includes a wireless charger as part of the support stand. In another example, the electronic device may be a laptop computer or desktop computer that is connected to a wireless charger via a wired connection (e.g., universal serial bus (USB)) connection.

In some examples, the remote device may be placed on the wireless charger to perform wireless charging. For example, the wireless charger may include a surface (also referred to as a platform) upon which the remote device may be placed to initiate wireless charging.

In some examples, the presence of the remote device on the wireless charger may be used for changing power states of the electronic device. For example, placing the remote device on the wireless charger may cause the electronic device to enter a first power state. In another example, removing the remote device from the wireless charger may cause the electronic device to enter a second power state. In some examples, the power states may include awake states and/or sleep states.

In some examples, the presence of the remote device on the wireless charger may be used for changing operating modes of the electronic device. For example, placing the remote device on the wireless charger may cause the electronic device to enter a first operating mode. In another example, removing the remote device from the wireless charger may cause the electronic device to enter a second operating mode. In some examples, the operating mode may include a login mode in which access to the electronic device is granted. In other examples, the operating mode may include a restricted access mode (e.g., lock mode) in which access to the electronic device is restricted.

In some examples, the electronic device may authenticate the remote device based on the presence of the remote device on the wireless charger. For example, the electronic device may perform a security handshake with the remote device via a wireless charger data channel or a radio link. Once the authentication is successful, the electronic device may wake up and enter a login mode. In another example, when the remote device is removed from the wireless charger, then the electronic device may enter a sleep state and/or restricted access mode.

Figure 1:
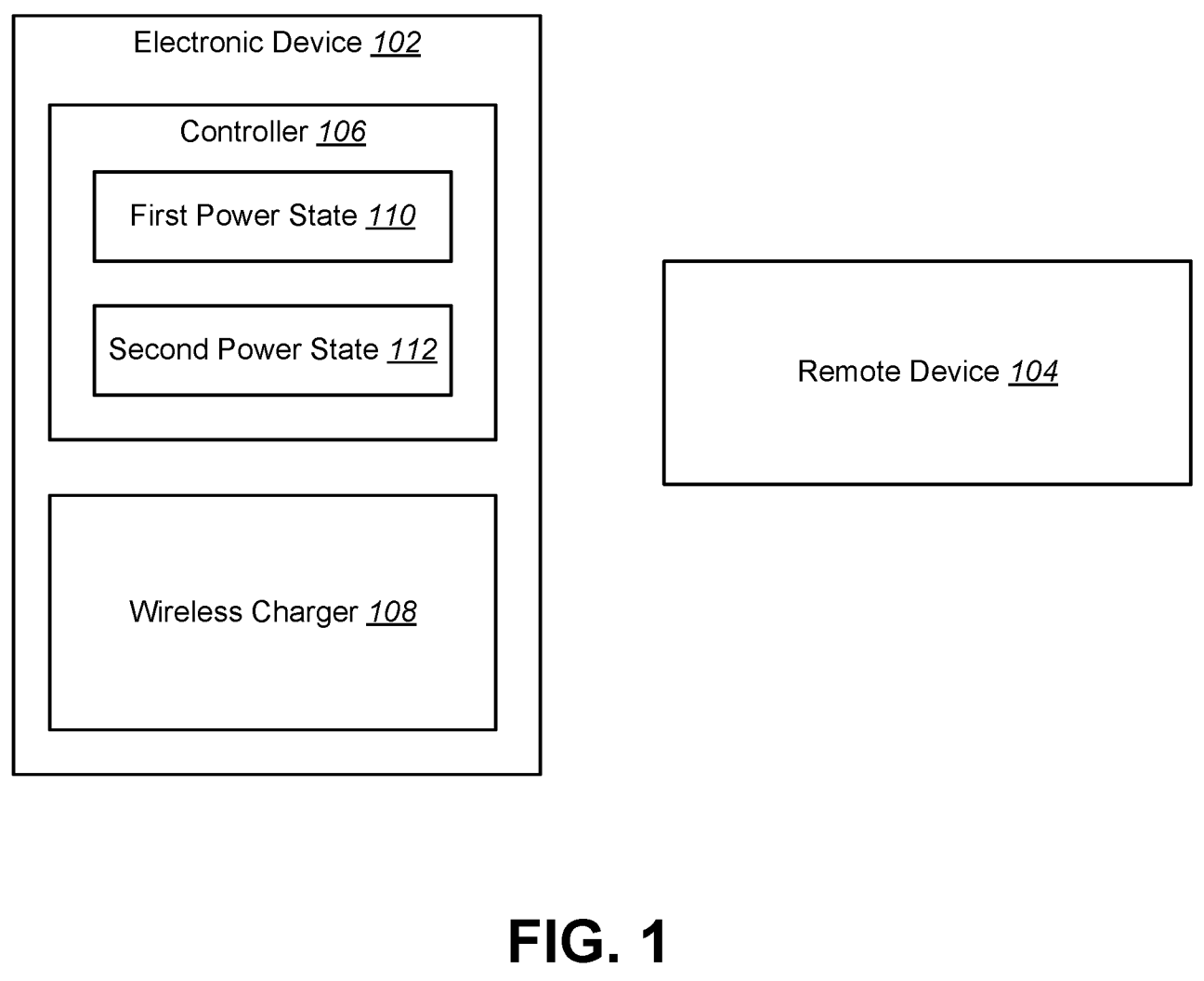

FIG. 1 is a diagram illustrating an example of an electronic device 102 that may be utilized for entering power states based on a wireless charger 108. Examples of the electronic device 102 may include computing devices, laptop computers, desktop computers, all-in-one computers, smartphones, tablet devices, graphic tablets, multi-touch devices, keyboards, wireless communication devices, game consoles, game controllers, computer docks, smart appliances, vehicles with electronic components, aircraft, drones, robots, smart appliances, etc. The electronic device 102 may include a controller 106. In some examples, the electronic device 102 (e.g., controller 106, wireless charger 108) may perform one, some, or all of the functions, operations, elements, procedures, etc., described in one, some, or all of FIG. 1-4.

In some examples, the controller 106 (also referred to as a processor) may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in memory (not shown). The processor may fetch, decode, and/or execute instructions stored in memory.

The memory may be any electronic, magnetic, optical, or other physical storage device that contains or stores electronic information (e.g., instructions and/or data). Thus, the memory may be, for example, Random Access Memory (RAM), Electrically Erasable Programmable Read-Only Memory (EEPROM), Dynamic Random Access Memory (DRAM), magnetoresistive random-access memory (MRAM), phase change RAM (PCRAM), memristor, flash memory, a storage device, and/or an optical disc, etc. In some examples, the memory may be a non-transitory tangible machine-readable storage medium, where the term "non-transitory" does not encompass transitory propagating signals. The controller 106 may be in electronic communication with the memory.

In some examples, the controller 106 may be combined with or separate from an applications processor (e.g., CPU) of the electronic device 102. In some examples, the controller 106 may be an embedded controller.

The controller 106 may include circuitry (e.g., integrated circuitry, semiconductor circuitry, electronic component(s), etc.). For example, the controller 106 may include digital logic circuitry (e.g., a controller processor), transistors, memory, etc. In some examples, the controller 106 may execute instructions and/or code to determine power states and/or operating modes for the electronic device 102 based on the presence of a remote device 104 in relation to the wireless charger 108.

The wireless charger 108 may include circuitry to perform wireless charging of a remote device 104. In some examples, the wireless charger 108 may use inductive coupling to transfer electrical energy to the remote device 104 without using a direct electrical connection (e.g., a wire, electrical contact pad, etc.). In some examples, the wireless charger 108 may operate according to a wireless charging standard (e.g., Qi standard, near-field communication (NFC) standard, AirFuel standard, etc.).

In the example of FIG. 1, the wireless charger 108 may be integrated into the electronic device 102. For example, in the case that the electronic device 102 is an all-in-one computer, the wireless charger 108 may be integrated into a stand (not shown) of the electronic device 102. In other examples, the wireless charger 108 may be separate from the electronic device 102 but may communicate with the electronic device 102 via a communication link. An example of a wireless charger 108 that is separate from the electronic device 102 is described in FIG. 2.

In some examples, the remote device 104 may be an electrical device that includes circuitry to perform wireless charging with the wireless charger 108. Some examples of the remote device 104 include a keyboard, mouse, controller, remote control, game controller, smartphone, tablet computer, etc. In some examples, the remote device 104 may receive electrical power from the wireless charger 108 via inductive coupling.

In some examples, the wireless charger 108 and/or the remote device 104 may be sized and positioned to accommodate placement of the remote device 104 on the wireless charger 108. For example, the wireless charger 108 may include a platform or other structure (e.g., slot, hook, channel, etc.) to accommodate physical placement and/or attachment of the remote device 104 on the wireless charger 108.

In some examples, the controller 106 may cause the electronic device 102 to enter a first power state 110 or a second power state 112 based on the presence of remote device 104 in relation to the wireless charger 108. In some examples, the first power state 110 may be a state of the electronic device 102 that includes a first set of powered resources and/or unpowered resources. The second power state 112 may be a state of the electronic device 102 that includes a second set of powered resources and/or unpowered resources. The set of powered resources and/or unpowered resources in the first power state 110 may differ from the set of powered resources and/or unpowered resources in the second power state 112.

In an example, when a user places a remote device 104 on the wireless charger 108, this placement may be an indication that the user is about to perform an activity on the electronic device 102. In the case that the electronic device 102 is a computing device (e.g., desktop computer, laptop computer, etc.), the user may place the remote device 104 (e.g., smartphone) on the wireless charger 108 before logging into the electronic device 102.

In a first case, the electronic device 102 is originally in a sleep state and the controller 106 may cause the electronic device 102 to enter an awake state in response to determining that the remote device 104 is placed on the wireless charger 108. For example, when the remote device 104 is placed on the wireless charger 108, the wireless charger 108 may detect the presence of the remote device 104 and may start wireless charging. The wireless charger 108 may send a signal (referred to herein as a first signal) to the controller 106 in response to the remote device 104 being placed on the wireless charger 108 and cause the electronic device 102 to enter an awake state.

In this case, the electronic device 102 may initially be in a sleep state before the remote device 104 is placed on the wireless charger 108. As used herein, a sleep state is a low-power state. The controller 106 may cause the electronic device 102 to enter a first power state 110 in response to determining that the remote device 104 is placed on the wireless charger 108. In this case, the first power state 110 may be an awake state. For example, the electronic device 102 may switch from a sleep state to an awake state in response to determining that the remote device 104 is placed on the wireless charger 108.

The awake state may be a state of the electronic device 102 for normal operations of the electronic device 102. For example, when the electronic device 102 is in the awake state, a user may access the electronic device 102 to perform operations. In the case of a computing device, an operating system (OS) and other subsystems (e.g., processors, memory, interfaces, communication devices, display, etc.) may be fully operational when the electronic device 102 enters the awake state.

In some examples, a sleep state may be a low-power state of the electronic device 102 in which operations of the electronic device 102 are suspended. Sleep state may also be referred to as sleep mode or hibernation mode. In an example of the sleep state, the state of the electronic device 102 may be held in memory (e.g., RAM) and, when placed in the sleep state, the electronic device 102 may cut power to subsystems and/or place the memory into a reduced power state.

In some examples, the controller 106 may cause the electronic device 102 to enter a login mode in response to entering the first power state 110. For example, the login mode may be a mode of operation of the electronic device 102 in which access to the electronic device 102 is granted. For instance, login mode may include a user being logged into an account on the electronic device 102.

In other examples, the login mode may be a login process. For example, the controller 106 may cause the electronic device 102 to present a login screen, login dialog or other login process to allow a user to access resources on the electronic device 102. Therefore, in this example, the user may be presented with the login process in response to the controller 106 determining that the remote device 104 is positioned on the wireless charger 108. In this case, the remote device 104 may act as a second-factor authentication for logging into the electronic device 102. In some examples, access to the electronic device 102 may be provided if the remote device 104 is present on the wireless charger 108. Otherwise, access to the electronic device 102 may be restricted, even if a login process is completed (e.g., user credentials are provided).

In some examples, the controller 106 may authenticate the remote device 104 in response to determining that the remote device 104 is placed on the wireless charger 108. For example, the remote device 104 may send identity data to the electronic device 102. The identity data may be information that uniquely identifies the remote device 104. Some examples of the identity data of the remote device 104 may include a serial number, media access control address (MAC address), electronic serial number (ESN), international mobile equipment identity (IMEI) number, international mobile subscriber identity (IMSI), a password, an encrypted secret, or other unique identifier.

In some examples, the identity data may be sent on a data channel of the wireless charger. For instance, the remote device 104 may communicate the identity data to the wireless charger 108 using inductive coupling. The wireless charger 108 may then send the identity data to the controller 106.

In other examples, the remote device 104 may use other radio communication to transmit the identity data to the electronic device 102. For example, upon detecting the remote device 104, the wireless charger 108 may send a signal to the remote device 104 to initiate a radio communication (e.g., Bluetooth, WiFi, ZigBee, WLAN, cellular, etc.) with the electronic device 102 to supply the identity data. The electronic device 102 may establish a radio communication link with the remote device 104 to receive the identity data.

Upon receiving the identity data, the controller 106 may authenticate the remote device 104 using the identity data. For example, the controller 106 may verify that the received identity data matches a stored identity that is granted permission to access the electronic device 102. If the identity data is determined to match a stored identity with access permission, then the remote device 104 may be authenticated.

In some examples, the controller 106 may cause the electronic device 102 to enter the first power state 110 (e.g., the awake state) in response to authenticating the remote device 104. In this case, the controller 106 may keep the electronic device 102 in a sleep state unless the controller 106 authenticates the remote device 104. If the remote device 104 is authenticated, then the controller 106 may send a wake signal to cause the electronic device 102 to enter the awake state, otherwise, the controller 106 may keep the electronic device 102 in a sleep state.

In some examples, the controller 106 may cause the electronic device 102 to enter the login mode in response to authenticating the remote device 104. For example, upon authenticating the remote device 104, the controller 106 may wake the electronic device 102 and provide access to resources on the electronic device 102. In other examples, the controller 106 may wake the electronic device 102 and cause the electronic device 102 to perform a login process (e.g., display a login screen). In this case, the authentication of the remote device 104 may be a second factor authentication for access to the electronic device 102. In some examples, the authentication of the remote device 104 may be used in addition to user credentials (e.g., username/password, biometrics, etc.).

The controller 106 may cause the electronic device 102 to enter a second power state 112 in response to determining that the remote device 104 is removed from the wireless charger 108. For example, the second power state 112 may be a sleep state. When the remote device 104 is removed from the wireless charger 108, the wireless charger 108 may send a signal (referred to herein as a second signal) to the controller 106. Upon receiving the second signal in response to the remote device 104 being removed from the wireless charger 108, the controller 106 may cause the electronic device 102 to enter the second power state 112 (e.g., the sleep state).

In some examples, the controller 106 may restrict access to the electronic device 102 in response to determining that the remote device 104 is removed from the wireless charger 108. For example, if the remote device 104 is removed from the wireless charger 108, then the controller 106 may lock the electronic device 102 to restrict access to resources on the electronic device 102. In other examples, the controller 106 may log a user out of a session on the electronic device 102 in response to determining that the remote device 104 is removed from the wireless charger 108.

In a second case, the controller 106 may cause the electronic device 102 to enter a sleep state in response to determining that the remote device 104 is placed on the wireless charger 108. In other words, the remote device 104 may trigger an opposite response in the electronic device 102 as compared to the first case described above. In some examples, the remote device 104 may be a keyboard, mouse or other controller. In some examples, the first power state 110 may be a sleep state and the second power state 112 may be an awake state. Examples of this second case are described in FIG. 2. For example, placing a keyboard or mouse in a certain location (e.g., on the wireless charger 108) may be an indication that the user has finished his or her activities. Therefore, the electronic device 102 may be ready to be placed into a sleep state and the user logged off.

In some examples, the electronic device 102 may include additional components and/or some of the components described herein may be removed and/or modified without departing from the scope of this disclosure. For example, the electronic device 102 may include an input/output interface (not shown) through which the electronic device 102 may communicate with an external device (e.g., a keyboard, mouse, a stylus pen, etc.). The input/output interface may include hardware and/or machine-readable instructions to enable the controller 106 to communicate with the external device or devices. The input/output interface may enable a wired or wireless connection to the external device or devices. In some examples, the input/output interface may further include a network interface card and/or may also include hardware and/or machine-readable instructions to enable the processor to communicate with various input and/or output devices, such as a keyboard, a mouse, a display, another apparatus, electronic device, computing device, etc., through which a user may input instructions and/or indications into the electronic device 102.

FIG. 2 is a block diagram illustrating another example of an electronic device 202 that may be utilized for entering power states based on a wireless charger 208. The electronic device 202 may be implemented in accordance with the electronic device 102 described in FIG. 1. For example, the electronic device 202 may include a controller 206 as described in FIG. 1.

In some examples, the electronic device 202 may be connected to an external wireless charger 208. For example, the wireless charger 208 may connect to the electronic device 202 via a USB connection or other wired connection. In other examples, the wireless charger 208 may be incorporated into the electronic device 202, as described in FIG. 1.

In a first case, the controller 206 may receive a first signal from the wireless charger 208 in response to the remote device 204 (e.g., a smartphone) being placed on the wireless charger 208. In this case, the electronic device 202 may initially be in a sleep state 214 when the remote device 204 is not on the wireless charger 208.

The controller 206 may cause the electronic device 202 to enter an awake state 216 based on the first signal. In some examples, the controller 206 may cause the electronic device 202 to enter the awake state 216 in response to receiving the first signal from the wireless charger 208. In other words, the controller 206 may wake the electronic device 202 immediately upon receiving the first signal.

In other examples, the controller 206 may authenticate the remote device 204 in response to receiving the first signal. For example, the controller 206 may include an authenticator 218 to perform authentication of the remote device 204. In some examples, the authenticator 218 may include instructions executed by the controller 206 to authenticate the remote device 204. The authentication may be accomplished as described in FIG. 1. In some examples, the controller 206 may cause the electronic device 202 to enter the awake state 216 in response to authenticating the remote device 204. In some examples, the electronic device 202 may enter a login mode in response to the controller 206 authenticating the remote device 204.

In some examples, the controller 206 may receive a second signal from the wireless charger 208 in response to the remote device 204 being removed from the wireless charger 208. For example, a user may remove the remote device 204 (e.g., smartphone) from the wireless charger 208. The controller 206 may cause the electronic device 202 to enter the sleep state 214 in response to receiving the second signal. In some examples, the controller 206 may cause the electronic device 202 to enter a restricted access mode (e.g., locked mode) in response to receiving the second signal.

In a second case, the controller 206 may cause the electronic device 202 to enter a sleep state 214 in response to determining that the remote device 204 is placed on the wireless charger 108. The electronic device 202 may initially be in a sleep state 214 when the remote device 204 is positioned on the wireless charger 208. In this second case, examples of the remote device 204 may include a keyboard or a mouse. A user may place the remote device 204 on the wireless charger 208 to charge. While the remote device 204 is positioned on the wireless charger 208, the electronic device 202 may be in a sleep state 214.

The controller 206 may determine that the remote device 204 is removed from a wireless charger 208. For example, a user may move the remote device 204 (e.g., keyboard or mouse) off of the wireless charger 208 to begin using the electronic device 202. The wireless charger 208 may send a signal to the controller 206 in response to detecting that the remote device 204 was removed from the wireless charger 208.

The controller 206 may cause the electronic device 202 to enter an awake state 216 in response to determining that the remote device 204 is removed from the wireless charger 208. For example, upon receiving the signal from the wireless charger 208, the controller 206 may generate a wake signal to cause the electronic device 202 to power on resources. In some examples, the electronic device 202 may perform a login process (e.g., display a login screen) in response to determining that the remote device 204 is removed from the wireless charger 208.

In an example of this second case, when a user removes the remote device 204 from the wireless charger 208, this may be an indication that work is about to begin. For instance, the remote device 204 may be a keyboard or mouse set on the wireless charger 208. The remote device 204 may be charging while not in use. As soon as a user removes the remote device 204 from the wireless charger 208, the controller 206 may cause the electronic device 202 to wake and enter into the login screen. Removing the remote device 204 (e.g., keyboard or mouse) may initiate a wake signal from the controller 206 to wake the electronic device 202. This may reduce the time it takes for a user to become productive at the electronic device 202.

In some examples, the controller 206 may determine that the remote device 204 is placed on the wireless charger 208. For example, at the end of a session using the electronic device 202, a user may place the remote device 204 (e.g., keyboard or mouse) onto the wireless charger 208 to charge. The controller 206 may cause the electronic device 202 to enter a sleep state in response to determining that the remote device 204 is placed on the wireless charger 208.

In some examples, the controller 206 may restrict access to the electronic device 202 in response to determining that the remote device 204 is placed on the wireless charger 208. For example, if the remote device 204 (e.g., keyboard or mouse) is placed on the wireless charger 208, then the controller 206 may lock the electronic device 202 and/or cause an active session on the electronic device 202 to log off. In some examples, a user may be logged off of the electronic device 202 when the remote device 204 is placed on the wireless charger 208.

FIG. 3 is a flow diagram illustrating an example of a method 300 for entering power states based on a wireless charger. The method 300 and/or an element or elements of the method 300 may be performed by an electronic device. For example, an element or elements of the method 300 may be performed by the electronic device 102 described in FIG. 1, the controller 106 described in FIG. 1, the electronic device 202 described in FIG. 2, and/or the controller 206 described in FIG. 2, any of which may be referred to generally as an "electronic device" in FIG. 3. In some examples, the method 300 may be performed by an embedded controller. In some examples, the method 300 may be performed by a processor of the electronic device.

An electronic device may determine 302 that a remote device (e.g., a keyboard or mouse) is removed from a wireless charger. For example, while the remote device is placed on the wireless charger, the electronic device may be in a sleep state. At some point, the remote device may be removed from wireless charger such that the wireless charger no longer detects the presence of the remote device. The wireless charger may generate a signal indicating that the remote device was removed from the wireless charger.

The electronic device (e.g., controller) may cause 304 the electronic device to enter an awake state in response to determining that the remote device is removed from the wireless charger. For example, upon receiving the signal from the wireless charger, the controller may generate a wake signal to cause 304 the electronic device to enter the awake state. In some examples, the electronic device may enter a login mode upon entering the awake state.

The electronic device may determine 306 that the remote device is placed on the wireless charger. For example, the user may place the remote device (e.g., a keyboard or mouse) on the wireless charger at the end of a session on the electronic device. In some examples, the wireless charger may detect the presence of the remote device based on the inductive coupling of wireless charger and the remote device. The wireless charger may generate a signal indicating that the remote device is placed on the wireless charger.

The electronic device (e.g., controller) may cause 308 the electronic device to enter a sleep state. For example, the controller may generate a sleep signal to cause 308 the electronic device to enter the sleep state. In some examples, access to the electronic device may be restricted in response to determining that the remote device is placed on the wireless charger.

Figure 4:
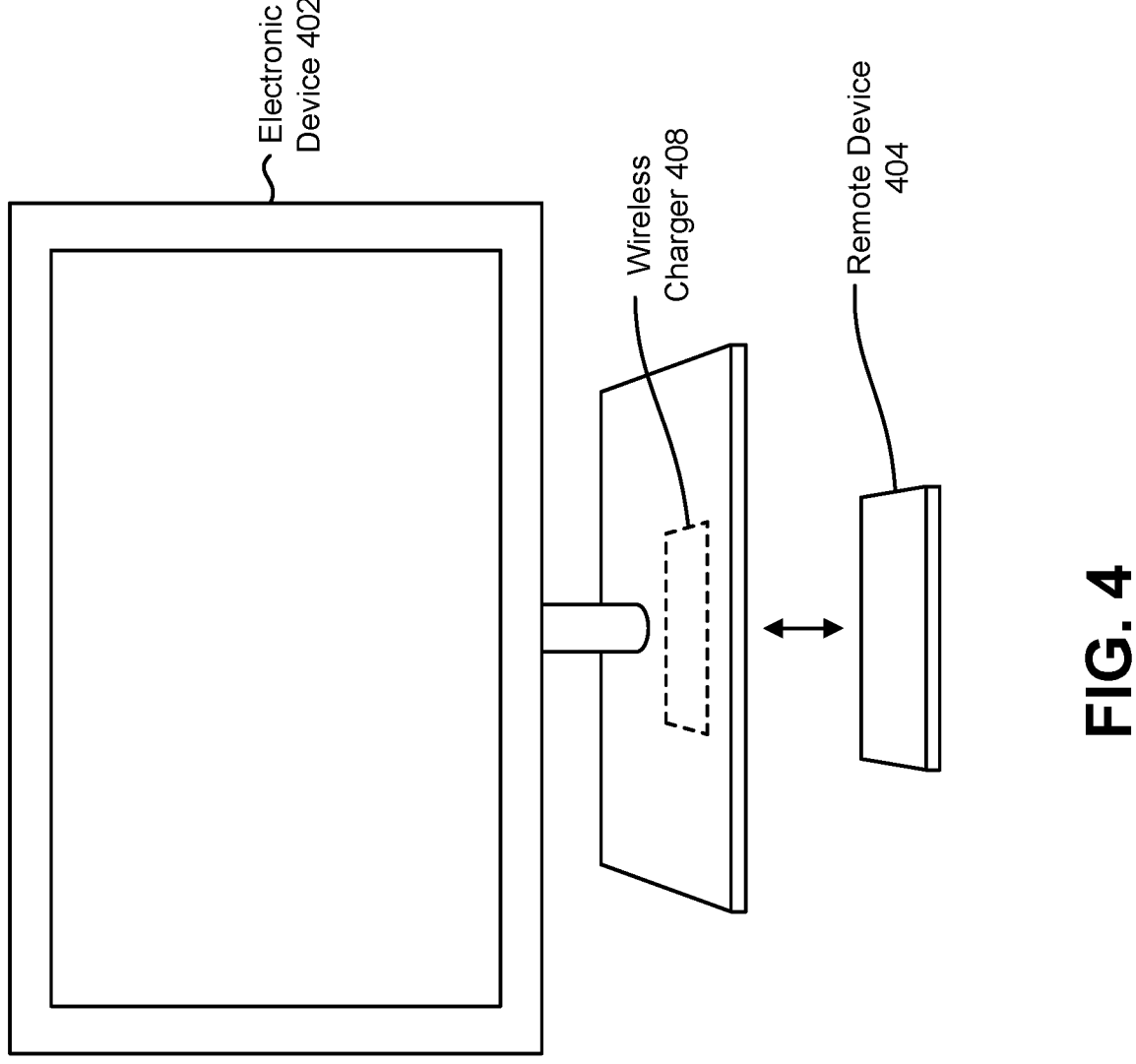
FIG. 4 is an example illustrating an electronic device for entering power states based on a wireless charger.

FIG. 4 is an example illustrating an electronic device 402 for entering power states based on a wireless charger 408. In this example, the electronic device 402 is an all-in-one computer that may be implemented in accordance with the electronic device 102 described in FIG. 1 or the electronic device 202 described in FIG. 2.

The electronic device 402 may include a wireless charger 408. In this example, the wireless charger 408 is integrated with the stand of the electronic device 402.

A remote device 404 may be placed on the wireless charger 408 or removed from the wireless charger 408. In a first case, placing the remote device 404 on the wireless charger 408 may cause the electronic device 402 to enter an awake state. For example, the remote device 404 may be a smartphone. When a user places the remote device 404 on the wireless charger 408, the electronic device 402 may enter the awake state.

In this first case, removal of the remote device 404 may cause the electronic device 402 to enter a sleep state. In some examples, access to resources of the electronic device 402 may be restricted in response to the electronic device 402 determining that the remote device 404 is removed from the wireless charger 408.

In a second case, placing the remote device 404 on the wireless charger 408 may cause the electronic device 402 to enter a sleep state. For example, the remote device 404 may be a keyboard, a mouse or other controller. When a user places the remote device 404 on the wireless charger 408, the electronic device 402 may enter the sleep state. In some examples, access to resources of the electronic device 402 may be restricted in response to the electronic device 402 determining that the remote device 404 is placed on the wireless charger 408.

In this second case, removal of the remote device 404 may cause the electronic device 402 to enter an awake state. For example, if a user moves the remote device 404 from the wireless charger 408, then the electronic device 402 may enter the awake state. In some examples, the electronic device 402 may also enter a login mode in response to determining that the remote device 404 is removed from the wireless charger 408.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
a wireless charger; and
a controller to:
   receive a first signal from the wireless charger in response to a remote device being placed on the wireless charger;
   authenticate the remote device based on identity data received from the remote device via at least one of a data channel of the wireless charger or a radio communication link;
   cause the electronic device to enter a first power state in response to authenticating the remote device;
   cause the electronic device to enter a login mode in response to entering the first power state;
   cause the electronic device to enter a second power state in response to determining that the remote device is removed from the wireless charger; and
   restrict access to the electronic device in response to determining that the remote device is removed from the wireless charger.

2. The electronic device of claim 1, wherein the first power state comprises an awake state.

3. The electronic device of claim 1, wherein the second power state comprises a sleep state.

4. The electronic device of claim 1, wherein the remote device comprises a smartphone.

5. The electronic device of claim 1, wherein the electronic device is to enter a login mode in response to authenticating the remote device.

6. A method, comprising:
receiving a first signal from a wireless charger in response to a remote device being placed on the wireless charger;
authenticating the remote device based on identity data received from the remote device via at least one of a data channel of the wireless charger or a radio communication link;
causing an electronic device to enter an awake state in response to authenticating the remote device;
causing the electronic device to enter a login mode in response to entering the awake state;
receiving a second signal from the wireless charger in response to the remote device being removed from the wireless charger; and
restricting access to the electronic device in response to the remote device being removed from the wireless charger.

7. A method, comprising:
determining that a remote device is removed from a wireless charger, wherein the remote device comprises a keyboard;
causing an electronic device to enter an awake state in response to determining that the remote device is removed from the wireless charger;
determining that the remote device is placed on the wireless charger; and
causing the electronic device to enter a sleep state in response to determining that the remote device is placed on the wireless charger.

8. An electronic device, comprising:

a wireless charger; and a controller to:

determine that a remote device is removed from the wireless charger, wherein the remote device comprises a keyboard;

cause the electronic device to enter an awake state in response to determining that the remote device is removed from the wireless charger;

determine that the remote device is placed on the wireless charger; and cause the electronic device to enter a sleep state in response to determining that the remote device is placed on the wireless charger.

9. The method of claim 7, further comprising restricting access to the electronic device in response to determining that the remote device is placed on the wireless charger.

10. The electronic device of claim 8, wherein the controller is to cause the electronic device to enter a login mode in response to determining that the remote device is removed from the wireless charger.

11. The electronic device of claim 8, wherein the controller is to restrict access to the electronic device in response to determining that the remote device is placed on the wireless charger.

12. The electronic device of claim 8, wherein the controller is to receive a signal from the wireless charger in response to the remote device being removed from the wireless charger.

13. The method of claim 9, further comprising causing the electronic device to enter a login mode in response to determining that the remote device is removed from the wireless charger.

\* \* \* \* \*